United States Patent
Westerberg

(10) Patent No.: US 7,369,818 B2
(45) Date of Patent: May 6, 2008

(54) FUNCTIONAL ASSEMBLY WITH AUTOMATIC ADAPTABLE WIRELESS CHARACTERISTICS

(75) Inventor: Anders K. Westerberg, Enköping (SE)

(73) Assignee: Zarlink Semiconductor AB (SE)

( * ) Notice: Subject to any disclaimer, the term of this patent is extended or adjusted under 35 U.S.C. 154(b) by 392 days.

(21) Appl. No.: 11/005,035

(22) Filed: Dec. 6, 2004

(65) Prior Publication Data

US 2005/0146460 A1 Jul. 7, 2005

(30) Foreign Application Priority Data

Dec. 6, 2003 (GB) .................... 0328369.4

(51) Int. Cl.
*H04B 1/02* (2006.01)

(52) U.S. Cl. .................... 455/91; 455/12.1; 455/456.3; 455/561; 455/427

(58) Field of Classification Search ................. 455/91, 455/12.1, 456.3, 561
See application file for complete search history.

(56) References Cited

U.S. PATENT DOCUMENTS

| | | | | |
|---|---|---|---|---|
| 5,678,182 A | * | 10/1997 | Miller et al. | 455/12.1 |
| 5,857,155 A | * | 1/1999 | Hill et al. | 455/456.3 |
| 5,864,764 A | * | 1/1999 | Thro et al. | 455/561 |
| 6,201,973 B1 | | 3/2001 | Kowaguchi | |
| 6,959,192 B1 | * | 10/2005 | Cannon et al. | 455/456.3 |
| 2002/0061754 A1 | | 5/2002 | Takano | |
| 2003/0054866 A1 | | 3/2003 | Byers et al. | |
| 2004/0199056 A1 | * | 10/2004 | Husemann et al. | 600/300 |

FOREIGN PATENT DOCUMENTS

| | | |
|---|---|---|
| DE | 10205710 A1 | 2/2002 |
| DE | 10163990 A1 | 6/2002 |
| EP | 1209863 A2 | 5/2001 |
| EP | 1298847 A1 | 4/2003 |
| GB | 2360863 A | 10/2001 |
| GB | 2371713 A | 7/2002 |
| WO | WO 02/39210 A2 | 5/2002 |

\* cited by examiner

Primary Examiner—Sanh D. Phu
(74) Attorney, Agent, or Firm—Lawrence E. Laubscher, Jr.

(57) ABSTRACT

A functional device is configured to communicate with one or more additional devices over a wireless communications link using wireless circuitry. The device includes a memory for storing information about different wireless characteristics in different geographic locations, a receiver for receiving information about the geographic location of the device, a memory for storing information about different wireless characteristics in different geographic locations, and a control element for retrieving information from the memory based on the geographic location of the device and configuring the wireless circuitry such that its wireless characteristics match the wireless characteristics retrieved from the memory appropriate for the geographic location.

19 Claims, 1 Drawing Sheet

FUNCTIONAL ASSEMBLY WITH AUTOMATIC ADAPTABLE WIRELESS CHARACTERISTICS

FIELD OF THE INVENTION

This invention relates to the field of wireless communication, and in particular to an assembly of one or more communicating devices wherein the wireless characteristics can be automatically adapted for any particular geographic location.

BACKGROUND OF THE INVENTION

Wireless communication is now becoming widespread in a variety of applications from cellular telephones to wireless networking. Wireless communication is also used in such devices as pacemakers, which may need to communicate to an external device carried outside the body. As people travel more, they have a need to take their wireless devices with them. The problem is that different parts of the globe have different regulations covering the use of radio frequencies. For example, in many frequency ranges no single frequency band can be used worldwide.

Where the communications device is static this is not a problem because the appropriate characteristics can be chosen at the time of installation. However, it does present a problem for body-worn, hand-held and portable systems, where the device must be used in several different places and where the device must communicate with a partner device, such as a controller. Currently, there is no way to design a device that can be legally used everywhere. For example, a pacemaker communicating with a control unit may be legal in the United States but illegal in Europe.

It is known, for example, from GB patent no. 2,371,713 to determine the position of a mobile device and reconfigure it automatically as it moves to a remote location. The prior art does not address the case of a pair of communicating devices, such as a pacemaker and controller, that may move location but that do not communicate with a base station and where there is no technical need to change the wireless characteristics of the communicating devices.

SUMMARY OF THE INVENTION

In accordance with the principles of the invention, a wireless assembly includes a receiver capable of identifying the actual geographic location of the device. A look-up table stores information about the permissible wireless characteristics for multiple locations, and wireless characteristics appropriate to the location are then chosen based on the information in the look-up table. The wireless characteristics of two or more communicating devices are then configured in accordance with the chosen characteristics.

Accordingly therefore the invention a functional assembly comprising a master device for performing a predetermined function; one or more partner devices; wireless circuitry in each of said master and partner devices to permit local communication between said master and said partner devices over a wireless link; a memory for storing information about wireless characteristics of different geographic locations; a radio receiver for receiving information about the geographic location of said assembly; and a controller for retrieving information from said memory based on said geographic location of said device and configuring said wireless circuitry such that its wireless characteristics match the wireless characteristics appropriate for said geographic location.

The functional assembly can include any functional device, such as a pacemaker for example, that needs to communicate over a wireless link with another device. It could also extend to a pair of communications devices, such as walkie-talkies, for example.

The receiver can suitably be a GPS (Global Positioning Receiver), although it will be understand that positional data can also be retrieved from other sources, such as land-based radio frequency positioning systems like LORAN. Also, wireless networks, such as Bluetooth, WiFi, or cellular systems could be employed.

The information contained in the memory is normally public information published by the authorities in each country or international standards authorities. The invention ensures that the devices in the assembly automatically conform to local regulations.

The invention also provides a wireless communication system comprising two or more functional devices, each having wireless circuitry for mutually communicating over a wireless link; a receiver in at least one of said devices for receiving information about the geographic location of the device; a memory in at least one of said devices for storing information about different wireless characteristics in different geographic locations; and a control element for retrieving information from said memory based on the geographic location of said devices and configuring said wireless circuitry such that its wireless characteristics match the wireless characteristics retrieved from said memory appropriate for said geographic location.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
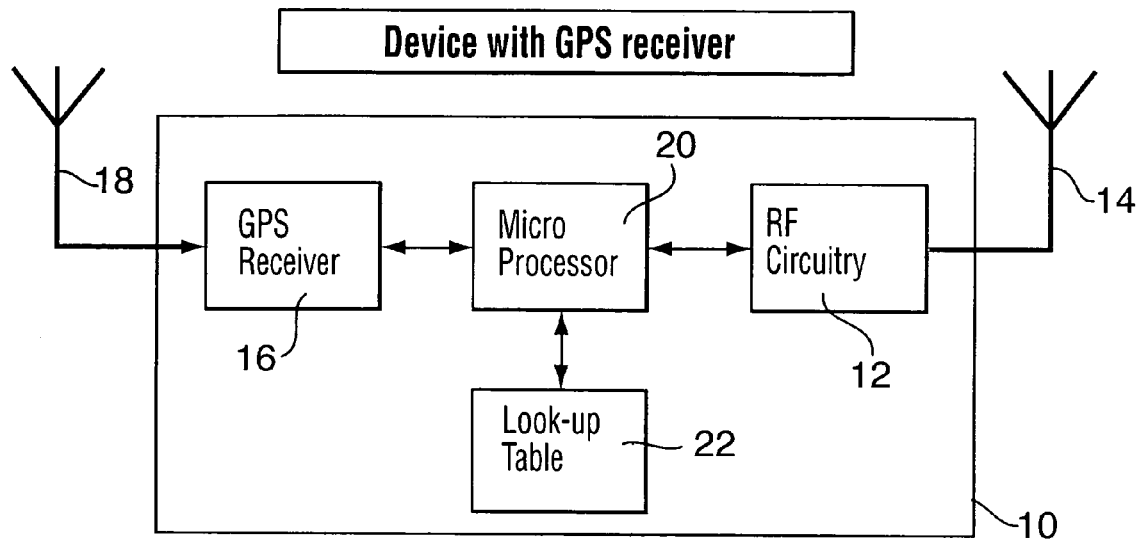
FIG. 1 is a block diagram of a functional device in accordance with one embodiment of the invention.

The device 10 shown in FIG. 1 can be any functional device that uses wireless to communicate with another partner device. In this example, it is assumed to be a pacemaker implanted in the body that uses wireless to communicate with a control device outside the body.

Currently, there is no way to choose a suitable radio frequency that will work everywhere. Frequencies that are available for use in some countries are not available in others. This makes it impossible to design communicating devices that can be used in any country. A user who travels from the United States to Europe, for example may find that he cannot legally use his pacemaker or other device on his travels. Clearly, this is an untenable state of affairs.

The device 10 includes RF circuitry 12 for communicating through an antenna with another device (not shown). The RF circuitry can be a transceiver, transmitter or receiver depending on the type of communications required. Typically, the circuitry will be a transceiver to permit two-way data communications with an external device. For example, in the case of a pacemaker the transceiver will be permit data to be transferred to the external device in response to an external command received over the wireless link.

The device further comprises a GPS receiver 16 connected to a GPS antenna 18 for receiving GPS data from GPS satellites.

The GPS data permits the precise geographic position of the functional device 10 to be determined. GPS receiver chips are commercially available. For example, a suitable GPS chipset would be the Instant GPS chip manufactured by Motorola.

The positional data at the output of the GPS chip is fed to microprocessor 20. Look-up table 22, which can be any suitable memory, such as a read-only memory (ROM), stores data pertaining to available frequencies correlated with GPS data. For example, if a particular country dictates the use of a certain radio frequency, the look-up table 22 will associate that radio frequency with the geographic boundaries of the country in question. The look-up table 22 associates the radio characteristics with regions bounded by GPS coordinates.

It should be noted that while it is possible to extract the exact geographic coordinates from the GPS data, this is not essential. The look-up table 22 can store the radio frequencies correlated directly with the raw GPS data. This solution can save processing.

During operation of the device, the GPS receiver 16 continuously picks up GPS satellite signals when they are available. The GPS data is monitored by the microprocessor 20, and whenever the device moves into a region with different radio characteristics, such as a different country, the microprocessor retrieves the appropriate data from the look-up table 22 and changes the operating frequency of the RF circuitry accordingly. If GPS data is not available, the device will continue to operate at the existing frequency until such time as a GPS signal is acquired and this shows that the device has moved into a different geographic area with different characteristics.

Figure 2:
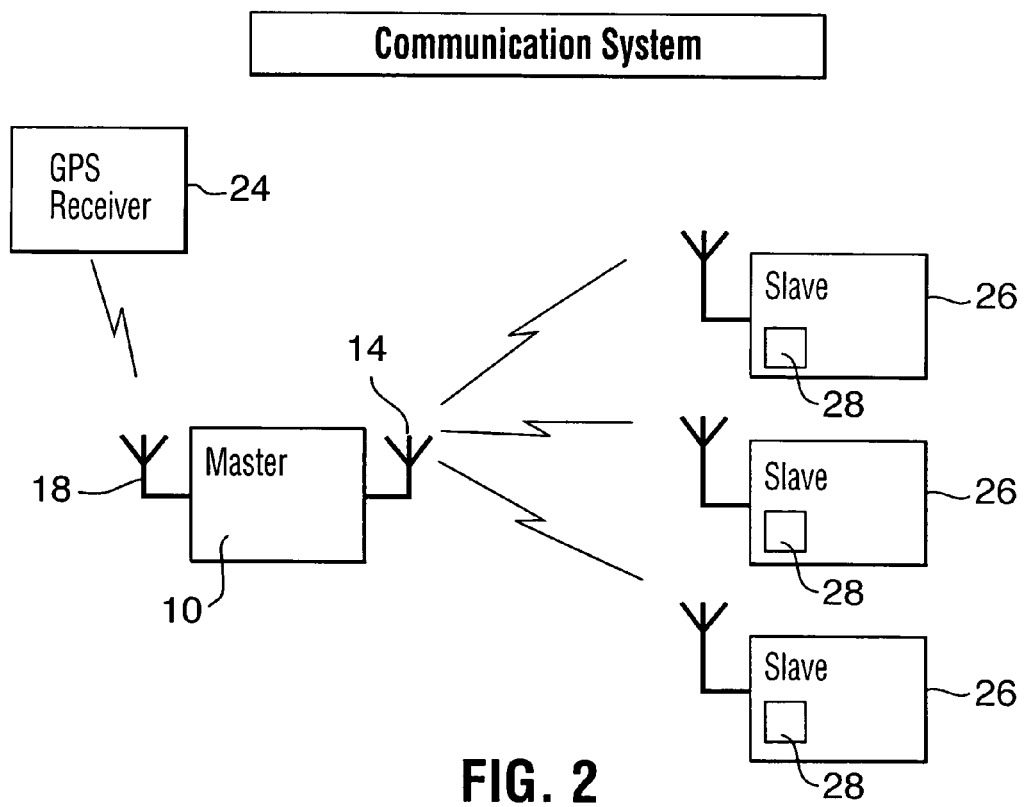
FIG. 2 is a block diagram of a communication system.

It is not necessary to include a GPS receiver in each communicating device. There are several ways to get all the devices to communicate using the same characteristics. For example, one device can act as a master picking up the GPS data and communicate a required change in frequency to a number of slave devices. Such an arrangement is shown in FIG. 2, where the device 10 is the master picking up GPS data from satellites 24. Whenever a change in location requiring a change in frequency is detected, the master device communicates with one or more existing slave devices 26 instructing them to change to a new identified frequency as determined by the look-up table in the master device. As they change frequency the slave devices 26 send an acknowledgement signal back to the master. When all the devices have acknowledged the change in frequency, the master updates its RF circuitry to the new frequency, and communication thereafter takes place on the new frequency.

In another embodiment, instead of having the master transmit a change in frequency to the slave devices, the latter can include a watch dog 28 that changes the radio receiver to scan other possible frequencies if no data has been received after a certain amount of time in order to determine whether the master device is transmitting on another frequency. If the watch dog 28 determines that the master is transmitting on another frequency, it changes the operational frequency of the slave device 26 to match the new frequency.

The watch dog 28 is typically in the form of a microprocessor that retrieves the possible frequencies from memory and changes the RF circuitry to check each frequency until it finds one that is active. The watch dog then sends a confirmation signal back to the master.

Another possibility is to put the GPS receiver in one of the slave devices 26. In that case the master can periodically poll the slave device with the GPS receiver to determine the actual position or alternatively the preferred radio frequency, which in this case can be stored in memory in the slave device with the GPS receiver.

A still further possibility is to provide a GPS receiver in each device and change the radio frequency independently at each device to agree with the radio frequency appropriate for the location.

The invention has been described in terms of radio frequencies, although it will be understood that the invention is also applicable to other radio characteristics, such as timing, packet formats and the like.

The invention claimed is:

1. A functional assembly comprising:
   a master device implantable in a human body for performing a medical function therein;
   a control device for controlling said master device;
   wireless circuitry in each of said master device and said control device to permit local communication between said master device and said control device over a wireless link;
   a memory for storing information about wireless characteristics of different geographic locations;
   a radio receiver for receiving information about the geographic location of said assembly; and
   a controller for retrieving information from said memory based on the geographic location of said master device and configuring said wireless circuitry in each of said master device and said control device to match wireless characteristics appropriate for said geographic location.

2. An assembly as claimed in claim 1, wherein said radio receiver is a GPS receiver for receiving GPS position data.

3. An assembly as claimed in claim 2, wherein said memory stores said wireless characteristics in association with regions bounded by GPS coordinates.

4. An assembly as claimed in claim 2, wherein said memory stores said wireless characteristics in association with raw GPS data.

5. A functional device as claimed in claim 1, wherein said receiver is a radio receiver for receiving land-based positional information.

6. An assembly as claimed in claim 1, wherein said controller is a microprocessor.

7. An assembly as claimed in claim 6, wherein said microprocessor is programmed to transmit a signal indicating a change of a wireless characteristic to said control device, and change said wireless circuitry to transmit using an updated wireless characteristic in response to an acknowledgement signal from said control device.

8. An assembly as claimed in claim 7, wherein said wireless characteristic is frequency.

9. An assembly as claimed in claim 1, which is a pacemaker system, and wherein said master device is a pacemaker.

10. A wireless communication system comprising:
    two or more functional devices, each having wireless circuitry for mutually communicating over a wireless link;
    a radio receiver in at least one of said devices for receiving information about the geographic location of the device;
    a memory in at least one of said devices for storing information about different wireless characteristics in different geographic locations; and
    a controller for retrieving information from said memory based on the geographic location of said devices and configuring said wireless circuitry in each of said functional devices to match the wireless characteristics retrieved from said memory appropriate for said geographic location, and wherein upon detection of a required change in said wireless characteristics said controller is programmed to update said wireless characteristics, and wherein at least one of said functional devices includes a watch dog programmed to scan available wireless characteristics in the event of no communication occurring over a predetermined period of time and update said wireless characteristics in the event that a signal is detected from another of said functional devices using different wireless characteristics.

11. A wireless communication system as claimed in claim 10, wherein said controller is a microprocessor.

12. A wireless communication system as claimed in claim 11, wherein one of said functional devices is a master, and one or more of said functional devices is a slave controlled by said master.

13. A wireless communication system as claimed in claim 12, wherein said receiver is in said master.

14. A wireless communication system as claimed in claim 13, wherein said microprocessor is in said master, and said microprocessor is programmed to change said wireless characteristics in response to a change in geographic location requiring different wireless characteristics.

15. A wireless communication system as claimed in claim 14, wherein upon detection of a required change in said wireless characteristics said microprocessor is programmed to transmit a signal to said one or more slave devices using current wireless characteristics and update said wireless characteristics in response to an acknowledgement signal from said one or more slave devices.

16. A wireless communication system as claimed in claim 12, wherein said receiver is in one of said slaves, and said slave is programmed to transmit a signal indicating a required change of wireless characteristics to said master.

17. A wireless communication system as claimed in claim 12, wherein each of said devices includes a receiver for extracting geographic positional information.

18. A wireless communication system as claimed in claim 12, wherein said wireless characteristics are the radio frequency.

19. A wireless communication system as claimed in claim 12, wherein said receiver is a GPS receiver.

* * * * *